March 22, 1966    J. S. COURTNEY-PRATT ETAL    3,241,930
LOW FRICTION BEARINGS
Filed April 3, 1963

INVENTORS J. S. COURTNEY PRATT
M. E. SIKORSKI
BY
H. O. Wright
ATTORNEY

3,241,930
LOW FRICTION BEARINGS
Jeofry S. Courtney-Pratt, Springfield, and Mathew E. Sikorski, New Providence, N.J., assignors to Bell Telephone Laboratories, Incorporated, New York, N.Y., a corporation of New York
Filed Apr. 3, 1963, Ser. No. 270,296
6 Claims. (Cl. 29—194)

This invention relates to bearing surfaces for bearings, journal boxes, journals and the like. More particularly, it relates to the reduction of frictional losses in machine elements of the above-mentioned and similar types and to the extension of the fault-free service life of such elements.

For several decades it has been standard practice to construct bearings, journal boxes, and the like with bearing surfaces of various alloys such as those known in the trade as "Babbitt metal," the latter name being applied to various alloys commonly containing, in various proportions, tin, antimony, lead, copper and occasionally other metals. Shaft journals supported by such bearings are normally of steel, cast iron, or a similar material. For the purposes of the present application the bearing per se and the journal accommodated by it are each designated by the generic term "bearing member."

While the above-mentioned alloys give good service, they are in general rather soft and their use involves appreciable frictional losses. Consequently, they wear appreciably and require periodic reconditioning and/or replacement.

In accordance with the principles of the present invention, it is proposed that the various Babbitt metal or other alloy surfaces for use in bearings, journal boxes and the like be replaced by surfaces of a metal selected from the group which consists of yttrium, gadolinium, dysprosium, samarium and holmium. All of these metals have appreciably lower friction with steel or similar materials than the Babbitt metals and similar alloys employed in the prior art. Furthermore, the metals of the above named group are appreciably harder than the alloys heretofore employed for bearing surfaces. These two characteristics, that is, lower friction and greater hardness, result in longer fault-free service life for bearings employing bearing surfaces of the above listed metals. Alternatively, for the reduction of friction and increased fault-free life, the journal of the shaft supported in the bearing may be coated, as by plating or the like, with a metal selected from the above named group and the bearing may be of steel or the like.

A principal object of the invention is, therefore, to reduce frictional losses and increase the length of fault-free service life for bearing members.

Figure 1:
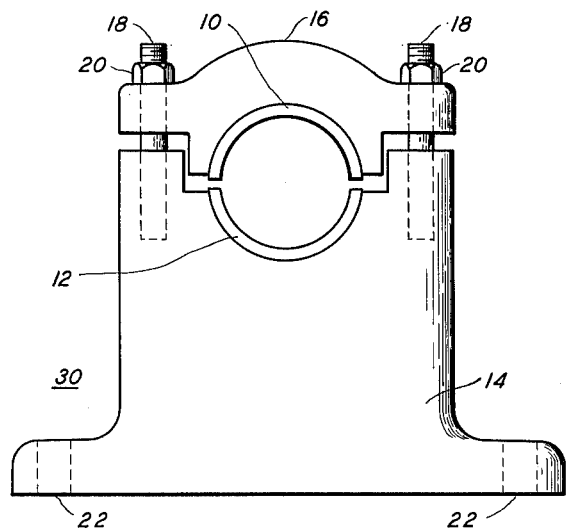
Figure 2:
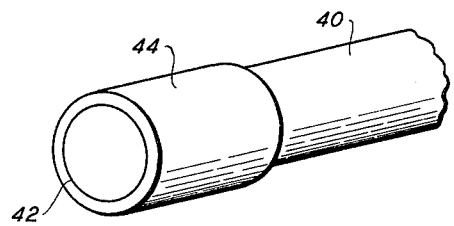

Other and further objects, features and advantages of the invention will become apparent from the detailed description hereinunder taken in conjunction with the appended drawing in which:

FIG. 1 illustrates a conventional bearing or journal housing having bearing surfaces of the invention; and FIG. 2 illustrates a shaft having a journal which is coated with a metal of the above named group.

In more detail in FIG. 1, bearing surfaces in the form of liners 10 and 12 are semicylindrical in shape and are supported in the cap 16 and base 14, respectively, of the bearing assembly 30, as shown. Threaded stud bolts 18 and nuts 20 are provided to clamp cap 16 to base 14 after the journal portion of a shaft, such as journal 42 of shaft 40 of FIG. 2, is assembled between bearing surface liners 10 and 12, in accordance with the usual practice in the art. If the bearing surfaces are of one of the group of metals named above, the journal is preferably of steel or the like and vice versa. Holes 22 in the base of housing member 14 are provided for mounting the assembly on a supporting surface.

In accordance with the present invention, the assembly of FIG. 1 can be conventional except that liners 10 and 12 are made of a metal selected from the group which consists of yttrium, gadolinium, dysprosium, samarium and holmium when a journal of steel or the like is to be employed.

Since all metals of this group have appreciably less friction with steel and similar metals than the Babbitt metal alloys and similar alloys conventionally used as bearing surfaces, and further since the metals of the above named group are appreciably harder than the alloys mentioned, bearing members equipped with bearing surfaces of a metal selected from the above named group will have a substantially longer fault-free service life.

Alternatively, the bearing surfaces may be of steel or the like and the journal of the shaft supported by the bearing may be coated with a metal of the above named group, as illustrated in FIG. 2 where shaft 40 which may, for example, be of steel has its journal portion 42 coated with a layer 44 of a metal selected from the above named group.

Obviously, the principles of the invention are readily embodied in numerous other arrangements in addition to that of the illustrative embodiments described in detail above. For example, one or the other of a pair of bearing members in small instruments such as meters, galvanometers, clockwork mechanisms and the like may be entirely of a metal selected from the above named group.

Numerous and varied modifications and rearrangements of the specific illustrative embodiments described in detail hereinabove can be readily devised by those skilled in the art without departing from the spirit and scope of the principles of the present invention.

What is claimed is:
1. A machine bearing comprising two relatively moving surfaces, one supporting the other, at least one of said surfaces being formed of a metal selected from the group consisting of yttrium, gadolinium, dysprosium, samarium and holminum.
2. The bearing of claim 1 wherein the bearing surface is formed of yttrium.
3. The bearing of claim 1 wherein the bearing surface is formed of gadolinium.
4. The bearing of claim 1 wherein the bearing surface is formed of dysprosium.
5. The bearing of claim 1 wherein the bearing surface is formed of samarium.
6. The bearing of claim 1 wherein the bearing surface is formed of holmium.

References Cited by the Examiner
UNITED STATES PATENTS

| | | | |
|---|---|---|---|
| 1,892,175 | 12/1932 | Stockfleth | 29—149.5 |
| 2,539,246 | 1/1951 | Hensel | 29—197 X |
| 2,737,707 | 3/1956 | Highet | 29—149.5 |
| 3,049,797 | 8/1962 | Drummond | 29—194 |

OTHER REFERENCES

Metals Handbook 1961, 8th edition page 1227.

"Rare Earth Research" by Nachman and Lundin, published by Gordon and Breach Science Publishers, New York. Copyright 1962. Effective date 1961 pages 107–122.

DAVID L. RECK, *Primary Examiner.*

HYLAND BIZOT, *Examiner.*